N. LASH.
Fruit-Gatherer.
No. 161,523.            Patented March 30, 1875.
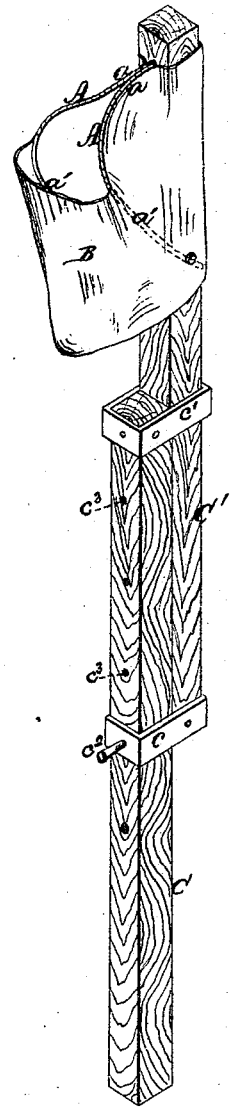
WITNESSES:
Jas. E. Hutchinson
J. H. Master
INVENTOR.
Nathan Lash
Edson Bros.
Attorneys.

UNITED STATES PATENT OFFICE.

NATHAN LASH, OF MONTPELIER, OHIO.

IMPROVEMENT IN FRUIT-GATHERERS.

Specification forming part of Letters Patent No. 161,523, dated March 30, 1875; application filed March 18, 1875.

*To all whom it may concern:*

Be it known that I, NATHAN LASH, of Montpelier, in the county of Williams and State of Ohio, have invented a certain new and useful Improvement in Fruit-Gatherers, of which the following is a full, clear, and exact description, reference being had to the annexed drawing, in which is illustrated a perspective view of my improved fruit-gatherer.

This invention relates to a certain improvement in fruit-gatherers; and it consists of curved jaws, having their convergent or horizontal arms attached to the upper end of a staff and bag or receptacle, and their vertical arms suitably secured to the sides or other portions of the said staff, substantially as hereinafter more fully set forth.

To enable others skilled in the art to which my invention appertains to make and use the same, I will proceed to describe it.

In the annexed drawing, A A refer to two curved jaws, the horizontal convergent arms $a\ a$ of which penetrate, or are otherwise secured to, the upper end of a staff, and are also attached to and hold the mouth of the bag or receptacle open, while the vertical arms $a'\ a'$ thereof are secured at their ends to the sides or other portions of the staff, in the manner shown in the drawing, or otherwise. B refers to a bag or receptacle for receiving and retaining the fruit being gathered by the jaws A A, it being attached to the latter, as above stated, and fastened around and to the staff at its upper part, in any known way, by which it is held open in readiness to be filled, and the main portion of the weight of its contents caught or supported upon the staff. C C' refer to the staff or staves, which are united together by metallic straps or frames $c\ c'$, one of which being attached to each of the said staves in such a manner that they, the latter, can be elongated or shortened, and held thus by a pin, $c^2$, passing through the lower one of the said frames or straps, and entering one of a series of perforations, $c^3\ c^3$, in the lower staff, the object of such adjustment of the staves being to permit of the gatherer being raised and lowered at pleasure in gathering the fruit.

To gather or pick the fruit, elevate the gatherer or curved jaws A A, so as to bring the stem between their horizontal convergent arms; then pull downward on the staff, when the fruit will be caught below, and pulled by the said jaws from the stem, or the stem and fruit pulled from the tree. As the fruit, in being pulled from the tree, is liable to strike against and roll down upon the staff, or at least that portion inclosed by the bag, such portion of the staff is armed with some soft or textile material to prevent the fruit from being bruised or otherwise damaged. I am aware of the attachment of a bag to a metallic loop projecting from a staff.

Having thus described my invention, what I claim, and desire to secure by Letters Patent, is—

The curved jaws A A, having their upper ends united and secured to the upper end of the staff C, and their lower ends separated and secured to each side of the said staff, the bag B being attached to the staff and to the jaws, all combined substantially as and for the purpose specified.

In testimony whereof I have hereunto signed my name this 7th day of March, 1874, in presence of two subscribing witnesses.

NATHAN LASH.

Witnesses:
JACOB MANON,
H. R. GOODRICH.